UNITED STATES PATENT OFFICE 2,193,748

RUBBER COMPOSITION AND ITS MANUFACTURE

Jules Treboux, Neue Welt, near Basel, Switzerland, assignor to the firm J. R. Geigy, S. A., Basel, Switzerland No Drawing. Application July 21, 1937, Serial No. 154,929. In Switzerland August 1, 1936

6 Claims. (Cl. 260—808)

This invention is based on the observation that vulcanized rubber can advantageously be protected against aging by adding small quantities of secondary naphthylglucamines to the rubber batches before vulcanization.

Such amines are partly known, partly they can be manufactured in known manner, for example by catalytic hydrogenation of glucose in presence of aromatic amines in the manner indicated in the British Patents No. 313,617 (for arabinose and cyclohexylamine etc.), No. 426,062 (for ammonia, aliphatic and araliphatic amines and monosaccharides) or No. 445,405 (for aliphatic polyhydroxy-aldehydes or -ketons and primary aromatic amines). The introduction of the polyhydroxyalkyl group into the naphthylamines may of course also be made afterwards as it is generally known in the art.

The glucamines have proved to be of very great advantage, especially those containing the $\alpha$- or $\beta$-naphthyl radical. But also nuclear substitution products or their derivatives alkoxylated or esterified at the hydroxy groups of the aliphatic side-chains may be used. As substituents of the aromatic radical, especially alkyl- or arylamino-groups may be mentioned, but also other mono- or polyhydroxyalkylated aminogroups are of advantage.

The naphthylglucamines used are mostly of resinous character, soluble in alcohol and dilute mineral and organic acids, insoluble in hydrocarbons such as benzene, benzine etc., which property of the age resister makes the final products more stable towards these solvents.

Example

2% of $\alpha$-naphthylglucamine $NH.CH_2(CHOH)_4.CH_2OH$

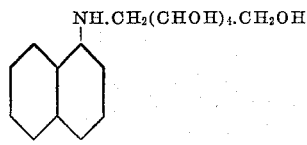

calculated on the rubber content are added as age resister to a conventional rubber batch and the whole is vulcanized at 145° C. under a pressure of 150 atm. for 45 minutes. For comparison the same batch with a compound known as a very good age resister (phenyl-$\beta$-naphthylamine) was made, also a control test-portion without any age resister. From the 5 mm. thick plates prepared with these masses rings of 50 mm. diameter and 5 mm. breadth were cut out and tested with the tearing machine of Schopper partly directly, partly after curing at 85–90° C. for seven days.

The average data were the following:

| Age resister | Kg. loading on tearing | | Percent elongation on tearing | |
|---|---|---|---|---|
| | Nonaged | Aged | Nonaged | Aged |
| 0 | 68.6 | 17.5 | 675 | 302 |
| Phenyl-$\beta$-naphthylamine | 76.3 | 39.4 | 711 | 498 |
| $\alpha$-naphthylglucamine | 73.0 | 44.0 | 702 | 547 |

Similar results were obtained with $\beta$-naphthylglucamine.

The $\alpha$-naphthylglucamine is made for example in the following manner:

Equimolecular parts of amine and glucose are boiled under reflux for 4 hours in 90% methyl alcohol, Ni-catalyst is added and the whole hydrogenized at 90–100° C. under 100 atm. hydrogen pressure. The theoretical amount of hydrogen having been taken up, the whole is filtered off from the catalyst and evaporated.

The naphthylglucamines have the consistency of ointments.

What I claim is:

1. A method of improving the age resisting properties of rubber, which comprises treating the same with a secondary naphthylglucamine.
2. A method of improving the age resisting properties of rubber, which comprises treating the same with $\alpha$-naphthylglucamine.
3. A method of improving the age resisting properties of rubber, which comprises treating the same with $\beta$-naphthylglucamine.
4. A rubber composition containing a secondary naphthylglucamine, having improved age resisting properties.
5. A rubber composition containing $\alpha$-naphthylglucamine, having improved age resisting properties.
6. A rubber composition containing $\beta$-naphthylglucamine, having improved age resisting properties.

JULES TREBOUX.